United States Patent
Bieber

[15] 3,636,793
[45] Jan. 25, 1972

[54] SHIFTING APPARATUS
[72] Inventor: William J. Bieber, Doylestown, Pa.
[73] Assignee: Mr. Gasket Company
[22] Filed: Nov. 18, 1970
[21] Appl. No.: 90,548

[52] U.S. Cl. ............................................. 74/473 R, 74/476
[51] Int. Cl. ................................................. G05g 9/00
[58] Field of Search .......................... 74/476, 477, 475, 473

[56] References Cited

UNITED STATES PATENTS

| | | | |
|---|---|---|---|
| 2,961,890 | 11/1960 | Marshall | 74/477 |
| 3,057,222 | 10/1962 | Almquist | 74/477 X |

*Primary Examiner*—Milton Kaufman
*Attorney*—Howson and Howson

[57] ABSTRACT

A shifter is provided for use in conjunction with a four-speed automobile transmission to permit rapid sequential gear changes without jamming upon displacement of a shift lever in alternate directions in a single plane. The shifter includes two members mounted side by side in a frame to pivot relative to one another with one member being connected to the first-second shift arm on the transmission and the other member being connected to the third-fourth shift arm on the transmission. Each member is provided with a recess which is selectively engaged by a selector pin mounted on a link carried on the shift lever to cause one or the other member to be displaced upon displacement of the shift lever. The recesses are located so as to register with one another when the shift lever and members are located in a neutral gear position to permit the selector pin to be transferred from engagement with one member and to the other, for instance during shifting from second to third gears or from either third or fourth to first or second gear. Gate means is associated with the frame for engaging the pin to prevent transfer of the pin from the first-second member during displacement of the shift lever in one direction between limit positions but to guide the pin out of engagement with the first-second connected member and into engagement with the third-fourth connected member during displacement of the shift lever in the other direction, thereby preventing the shifter from inadvertently jamming during rapid shifting and preventing unintentional shifting of the transmission into nonsequential gears during rapid upshifting or downshifting.

17 Claims, 9 Drawing Figures

PATENTED JAN 25 1972

INVENTOR;
WILLIAM J. BIEBER
BY
Howson & Howson
ATTYS.

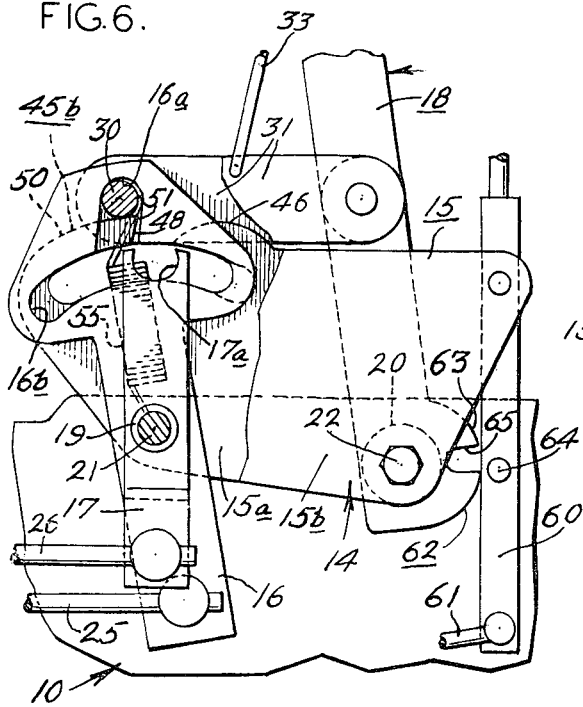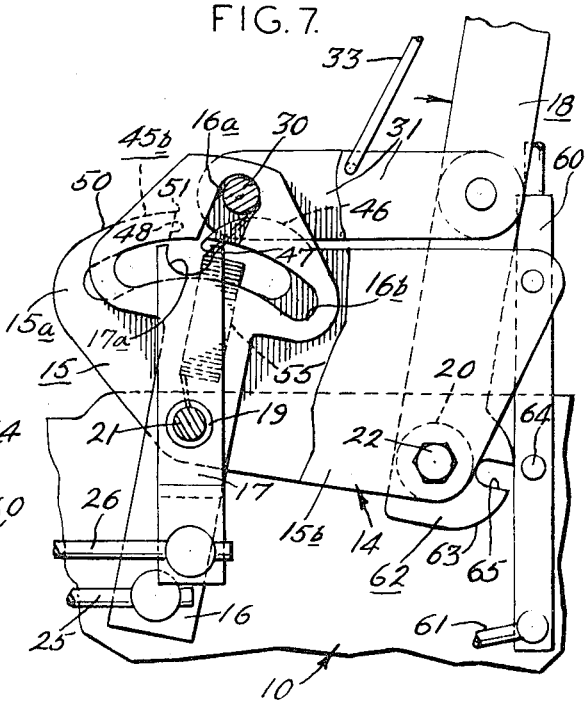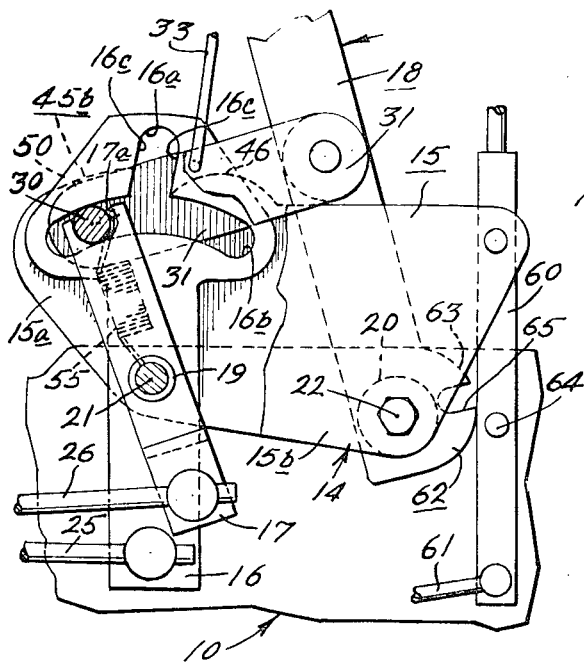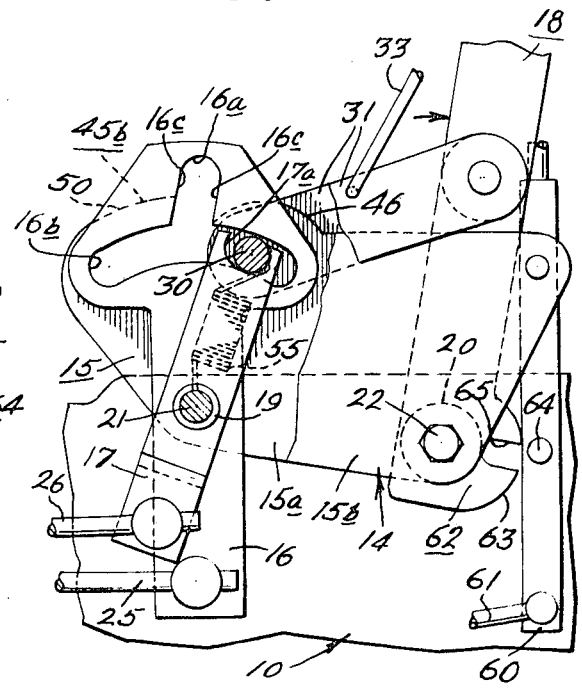

SHIFTING APPARATUS

The present invention relates to manual shifters for automotive transmissions; and more particularly, the present invention relates to manual shifters of the type which operate upon displacement of the shift lever in a single plane to effect gear changes.

Shifters have been proposed for automotive transmissions to enable gears to be changed selectively upon pivotal movement of a shift lever in a single plane rather than in the conventional "H" pattern. Examples of such shifters are disclosed in U.S. Pat. Nos. 2,961,890, 3,229,547, and 3,057,222. Although the shifters disclosed in these patents may operate satisfactorily during the relatively slow shifting which occurs during normal street driving, they are not readily adapted for the relatively rapid shifting which occurs during racing. For instance, in each of the above-noted shifters there exists the possibility that the shift selector pin may become locked in the recesses of both shift members and the shifter jammed during transfer of the pin from one member and to the other during rapid shifting. In addition, there exists the possibility that the transmission may be unintentionally placed in a gear which is not in the proper sequence during rapid upshifting or downshifting.

At present, a shifter is available which cannot jam during rapid upshifting or downshifting. The shifter is disclosed in my U.S. Pat. No. 3,456,522 and operates upon displacement of a shift lever in a single plane to effect gear changes. Although my present shifter operates satisfactorily, a shifter which possesses fewer moving parts and which is economical to manufacture is highly desirable.

With the foregoing in mind, it is a primary object of the present invention to provide a novel shifter which cannot jam during rapid shifting.

It is another object of the present invention to provide an improved jam-proof shifter which has a minimum of moving parts and which is economical to manufacture.

As a still further object, the present invention provides unique gate means for use with a shifter to prevent jamming of the shifter during rapid shifting such as occurs during racing.

As another object, the present invention provides a new shifter which operates to prevent the transmission from being unintentionally placed in a gear which is not in the proper sequence during rapid upshifting or downshifting.

More specifically, the present invention provides a jam-proof shifter which is particularly suited for use in conjunction with a four-speed automobile transmission having a first-second shift arm and a third-fourth shift arm. The shifter comprises a frame, a primary shift lever mounted in the frame to pivot in a single plane in alternate directions between limit positions corresponding to different gears, and two members mounted in the frame to pivot relative to one another with one member being connected to the first-second shift arm and the other member being connected to the third-fourth shift arm. The members are selectively coupled to the shift lever by means of a selector pin carried on a link pivotally mounted on the shift lever. The pin engages in a downwardly open recess in the one member to operate the first-second shift arm upon displacement of the shift lever; and, the pin engages in an upwardly open recess in the other member to operate the third-fourth shift arms upon displacement of the shift lever. The recesses are located so as to register with one another when the shift lever, the members, and the shift arms are in their neutral gear positions to permit the pin to transfer from one member to the other, for instance during shifting from second to third gears. Means is provided to bias the pin into the upwardly open recess, and means is provided to selectively displace the pin against its bias and into the downwardly open recess for initiating sequential shifting from first through fourth gear upon displacement of the shift lever in alternate directions. Gate means is provided to engage the pin for preventing the pin from transferring from the first-second connected member during displacement of the lever in one direction between its first and second gear positions and to guide the pin into engagement with the third-fourth connected member during displacement of the shift lever in the opposite direction between its second-third gear positions. The bias applied to the pin maintains the pin in engagement with the proper member during shifting from third to fourth gears. In this manner, jamming of the shifter during rapid shifting from second to third gear and inadvertent shifting of the transmission from first to fourth gears during upshifting is prevented. A secondary shift lever is connected to a reverse shift arm on the transmission for shifting the transmission into reverse gear; and, lockout means is provided on the shift levers to enable the transmission to be shifted into reverse only when the primary shift lever is in its neutral position.

These and other objects, features and advantages of the present invention should become apparent from the following description when taken in conjunction with the accompanying drawings in which:

FIGS. 6, 7, 8 and 9 are views similar to FIG. 3 but illustrating the shifter in various gear positions, FIG. 6 illustrating the shifter in first gear, FIG. 7 illustrating the shifter in second gear, FIG. 8 illustrating the shifter in third gear, and FIG. 9 illustrating the shifter in fourth gear.

Figure 1:
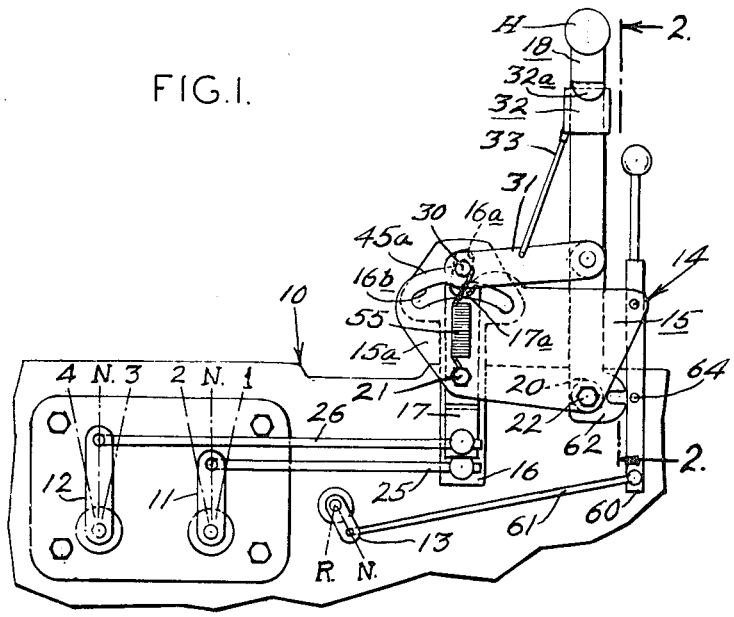
FIG. 1 is a side elevational view of a four-speed automobile transmission mounting a shifter embodying the present invention.

Referring now to the drawings, there is illustrated in FIG. 1 an automobile transmission 10 which, in the present instance, has four forward and one reverse gear. The forward gears are changed by means of shift arms 11 and 12 mounted to pivot on the side of the transmission; and, the reverse gear is operated by means of an arm 13 pivotally mounted rearwardly of the forward shift arms 11 and 12. In the illustrated embodiment, the transmission is in neutral when the arms 11 and 12 are disposed in parallel upright positions. The transmission is in first gear when the arm 11 is pivoted clockwise into its rearward limit position; and, the transmission is in second gear when the arm 11 is pivoted counterclockwise into its forward limit position. The transmission is in third gear when the arm 12 is pivoted clockwise into its rearward limit position; and, the transmission is in fourth gear when the arm 12 is pivoted counterclockwise into its forward limit position. Clockwise pivotal movement of the arm 13 into its forward limit position places the transmission in reverse.

Figure 5:
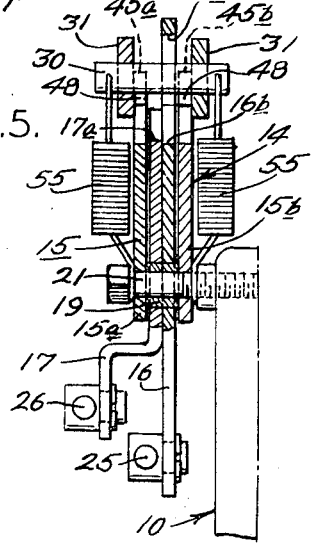
FIG. 5 is a sectional view taken along line 5—5 of FIG. 3.

For the purpose of selectively pivoting the arms 11, 12 and 13, a shifter 14 is provided. The shifter 14 comprises a frame 15 which pivotally mounts two members 16 and 17 in side-by-side relation and which mounts a primary shift lever 18 rearwardly of the two members 16 and 17 to pivot in a vertical plane extending forwardly and rearwardly of the transmission. The frame 15 includes two plates 15a and 15b (FIG. 5) disposed on opposite sides of the members 16 and 17 and the shift lever 18 and spaced apart by means of hollow collars 19 and 20 compressed endwise between the plates 15a and 15b by threaded fasteners 21 and 22 which, in the present instance, include bolts engaging opposite sides of the plates 15a and 15b. The bolts 21 and 22 extend through the collars 19 and 20, respectively, normal to the plane of the plates 15a and 15b and threadedly engage in the transmission 10 to mount the shifter 14 to the transmission. The collar 19 provides a journal on which the members 16 and 17 pivot; and, the collar 20 provides a journal on which the primary shift lever 18 pivots. In the illustrated embodiment, the member 16 is connected at its lower end through linkage 25 to the first-second shift arm 11; and, the member 17 is connected at its lower end through linkage 26 to the third-fourth shift arm 12. As may be seen in FIG. 1, the members 16 and 17 are in side-by-side alignment with one another when the shift arms 11 and 12 are in their neutral positions.

The shift lever 18 is coupled to the members 16 and 17 in a manner which effects forward gear changes in the transmission 10 upon displacement of the lever 18 in alternate directions in a single plane. To this end, the upper portion of the first-second connected member 16 has a downwardly open recess 16a which opens into an arcuate slot 16b having a predetermined radius of curvature with respect to the pivotal axis of the member 16; and, the upper end of the third-fourth connected member 17 has an upwardly open recess 17a. The shift lever 18 is selectively connected to the members 16 and 17 through a cylindrical selector pin 30 mounted on links 31,31 which are pivotally carried on the shift lever 18 and which extend laterally and forwardly therefrom in the plane of movement of the lever 18. As may be seen in FIG. 5, the pin 30 is disposed transversely to the plane of movement of the lever 18 and extends outwardly beyond the plates 15a and 15b. Thus, when the selector pin 30 is engaged in the recess 16a of the first-second connected member 16, displacement of the shift lever 18 counterclockwise from its neutral position (FIG. 3) and into its forward limit position (FIG. 6) causes the transmission to be shifted into first gear; and, displacement of the shift lever 18 in the opposite or clockwise direction into its rearward limit position (FIG. 7) causes the transmission to be shifted into second gear. When the selector pin 30 is engaged in the recess 17a of the third-fourth connected member 17, displacement of the shift lever counterclockwise into its forward limit position (FIG. 8) from its neutral position (FIG. 3) causes the transmission to be shifted into third gear; and, displacement of the shift lever into its rearward limit position (FIG. 9) from its forward limit position (FIG. 8) causes the transmission to be shifted into fourth gear.

The shifter 14 is constructed to permit transfer of the selector pin 30 between the first and second connected members only when the shift arms 11 and 12 and hence the transmission are in neutral. To this end, the downwardly open recess 16a in the first-second member 16 is located so as to register with the upwardly open recess 17a in the third-fourth member 17 only when the members 16 and 17, and hence the shift arms 11 and 12 and shift lever 18, are in their neutral positions intermediate their limit positions (See FIG. 3). Thus, the selector pin 30 is disengaged from the first-second connected member 16 and is engaged with the third-fourth connected member 17 upon counterclockwise pivotal displacement of the links 31,31; and, the pin is disengaged from the third-fourth connected member 17 and engaged with the first-second connected member 16 upon clockwise pivotal displacement of the links 31,31.

Figure 2:
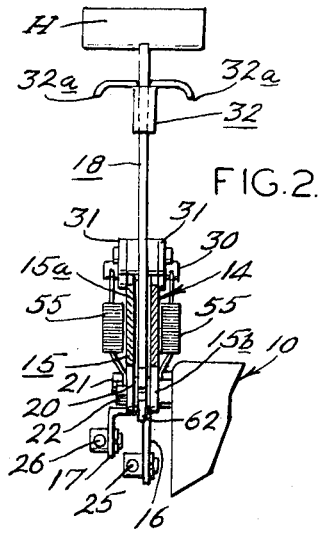
FIG. 2 is a sectional view taken along line 2—2 of FIG. 1.
Figure 3:
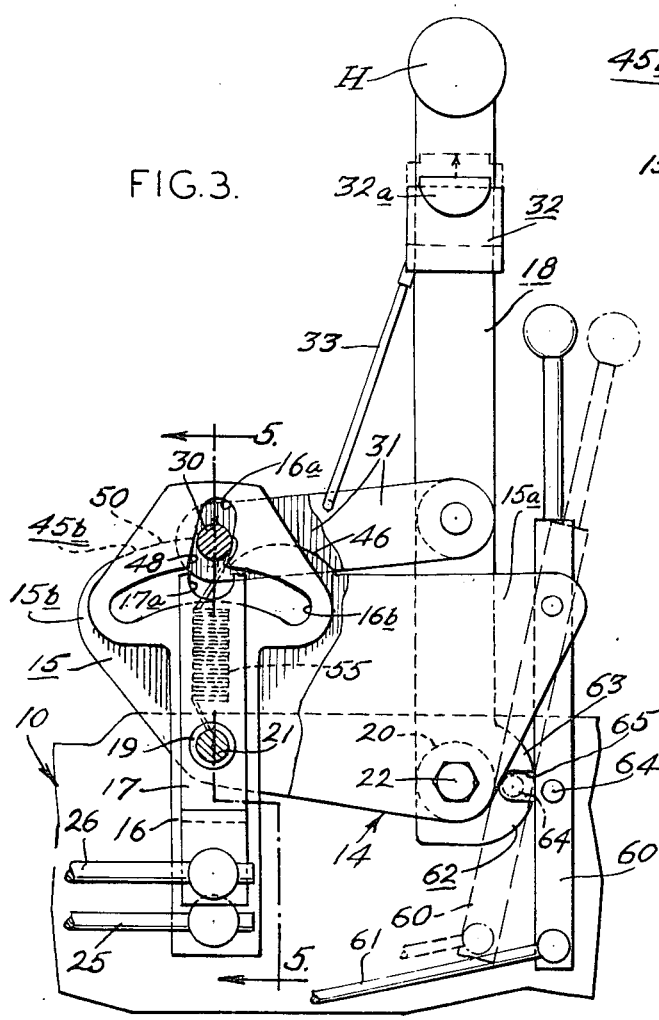
FIG. 3 is an enlarged side elevational view of the shifter illustrated in FIG. 1 with portions broken away, the shifter being shown in its neutral position.

For the purpose of engaging the selector pin 30 in either the recess 16a or the recess 17a to shift the transmission between first and second or third and fourth gears, an operator 32 is provided on the shift lever 18 and connector means 33 is provided to couple the operator 32 to the links 31,31 (See FIGS. 2 and 3). In the present instance, the operator 32 is mounted to slide on the lever 18, and the operator 32 has grips 32a,32a which extend outwardly of the plane of movement of the lever 18 and substantially parallel to the handle H of the lever 18. The length of the connector means 33 is selected to dispose the operator-grips 32a,32a adjacent the handle H to enable a driver to grip the operator without removing his hand from the handle H during shifting. Thus, displacement of the operator 32 into its uppermost limit position as indicated in broken lines in FIG. 3 causes the selector pin 30 to engage the first-second member 16; and, displacement of the operator 32 into its lowermost limit position causes the selector pin 30 to engage the third-fourth connected member 17.

In accordance with the primary object of the present invention, the shifter 14 is constructed so as not to jam or to shift the transmission into undesired gears during rapid sequential up or down shifting. To this end, gate means (FIG. 4) is associated with the frame 15 for engaging the selector pin 30 to prevent disengagement of the pin 30 from the recess 16a in the first-second connected member 16 during displacement of the shift lever 18 in one direction, in the present instance clockwise or rearwardly from its first gear position (FIG. 6) and into its second gear position (FIG. 7). The gate means also operates to guide the selector pin 30 out of engagement with the recess 16a in the first-second connected member 16 and into the recess 17a in the third-fourth connected member 17 during displacement of the shift lever 18 in the opposite or counterclockwise direction into the third gear position (FIG. 8). In the illustrated embodiment, the gate means comprises identical interrupted guide surfaces 45a and 45b provided on the top edges of the frame plates 15a and 15b, respectively. As may be seen in FIGS. 3 and 4, the guide surface 45b has one guiding portion 46 extending clockwise in an arc from a terminus 47 located rearwardly adjacent the recess 17a of the third-fourth connected member 17. Thus, upon displacement of the shift lever 18 counterclockwise from its second gear position, the pin 30 rides over the guiding portion 46 and drops into the recess 17a in the third-fourth member 17.

Figure 4:
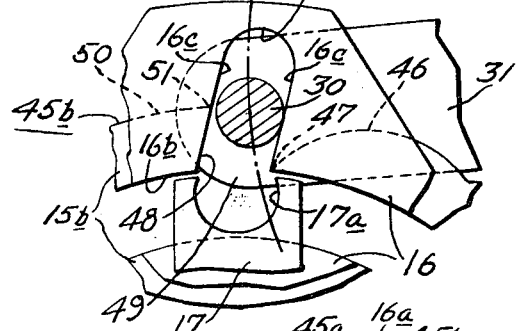
FIG. 4 is an enlarged fragmentary view of the shifter of FIG. 3.

In order to ensure positive disengagement of the selector pin 30 from the first-second member 16 and transfer to the third-fourth member 17 during rapid displacement of the shift lever from its second to third gear positions, the guide surface 45b is provided with a camming surface portion 48 (FIG. 4). In the illustrated embodiment, the camming surface 48 is disposed forwardly of the recess 17a and is inclined with respect to the guiding surface 46 to form a smoothly tapered entrance to a gap 49 defined between the camming surface 48 and the terminus 47 of the guiding surface 46. The gap 49 is sized to permit passage of the selector pin 30. Thus, upon forward or counterclockwise displacement of the shift lever 18, the selector pin 30 engages the camming surface 48 and is urged downwardly in a positive manner into the recess 17a in the third-fourth member 17.

In addition, it is to be noted that a supplemental downward camming action on the pin 30 is provided by surfaces on the member 16. For this purpose, the recess 16a has confronting parallel walls 16c,16c which are inclined rearwardly with respect to a line normal to the centerline of the arcuate slot 16b with the members 16 and 17 in their neutral positions. By virtue of this structure, displacement of the shift lever 18 as described above causes the selector pin 30 to engage the frontwardmost of the walls 16c,16c; and, inertial and frictional forces cause the member 16 to resist motion to thereby cam the pin 30 downwardly.

In order to arrest motion of the members 16 and 17 during transfer of the selector pin 30 from one to the other, the camming surface 48 is also inclined at the same angle as the walls 16c,16c. Thus, when the first-second member 16 is displaced into its neutral position as illustrated in FIG. 3, for instance during upshifting, the selector pin 30 engages both the camming surface 48 and the walls 16c,16c of the recess 16a to arrest forward motion of the first-second member during transfer of the selector pin 30. In the absence of arrested motion, the first-second member 16 would by its own inertia continue to pivot into its first gear position and prevent shifting of the transmission into the desired third gear. Conversely, upon rearward or clockwise displacement of the shift lever 18, for instance during downshifting from its third gear position and with the operator 32 being urged upwardly, the selector pin 30 engages both the terminus 47 and the recess 17a to arrest rearward motion of the third-fourth member 17. In the absence of arrested motion, the third-fourth member 17 would continue by its own inertia to pivot into its third gear position and prevent shifting of the transmission into the desired second gear.

According to the present invention, the shifter 14 operates automatically to upshift the transmission 10 without jamming upon displacement of the shift lever in alternate directions between its limit positions. To this end, means are provided to bias the selector pin 30 out of engagement with the first-second member 16 and into engagement with the third-fourth member 17 and means are provided to maintain the selector pin 30 engaged with the first-second member 16 after the driver places the shifter in its first gear position (FIG. 6) and releases the operator 32. In the illustrated embodiment, the selector pin 30 is biased downwardly by means of extension springs 55,55 which are located along side the frame plates 15a and 15b and which are connected to and between the selector pin 30 and the mounting bolt 21. Preferably, the extension springs 55,55 are selected so as to be at least partially extended when the pin is engaged in the recess 17a to ensure positive seating of the selector pin 30 therein during displacement of the lever 18 between its third and fourth gear positions.

In order to maintain the selector pin 30 engaged with the first-second member 16, the interrupted guide surface 45b has another portion 50 which extends forwardly of the gap 49 and which forms an intersection 51 with the camming surface 48. As may be seen in FIG. 4, the intersection 51 is spaced from the terminus 47 a distance, measured radially of the pivot arc A of the pin 30, which is less than the diameter of the pin 30. In addition, the intersection 51 is spaced radially outward of the pivot axis of the members 16 and 17 a greater distance than the corresponding spacing of the terminus 47 and curved surface 46. Thus, when the shift lever 18 is displaced rearwardly from its first gear position illustrated in FIG. 6, the pin 30 is pivoted downwardly under the biasing force of the springs 55,55 and engages the surface 46 rearwardly of the terminus 47. In this manner, the pin 30 is prevented from disengaging the first-second member 16 and engaging the third-fourth member 17 upon displacement of the shift lever 18 from its first to its second gear positions. Of course, during rapid shifting and depending upon the strength of the springs 55,55, the pin may stay engaged in the recess 16a until rearward motion of the shift lever 18 is arrested when it reaches its rearward limit position. When the shift lever 18 is displaced forwardly from its second gear position, the pin 30 is urged downwardly onto the guiding surface 46 by the combined action of the springs 55,55 and the slot walls 16c,16c. Continued motion of the shift lever causes the pin 30 to engage the cam surface 48 and be urged into the recess 17a in the third-fourth member 17 to displace the member 17 and hence place the transmission in third gear. Rearward displacement of the lever 18 from its third gear position causes the transmission to be shifted into fourth gear.

For the purpose of placing the transmission 10 in reverse gear, a secondary shift lever 60 is provided. As may be seen in FIG. 3, the secondary lever 60 is mounted in the frame 15 rearwardly of the primary shift lever 18 and between the plates 15a and 15b to pivot in the plane of the primary shift lever 18. The secondary lever 60 is connected at its lower end through linkage 61 to the reverse shift arm 11 on the transmission 10. Thus, displacement of the secondary shift lever 60 rearwardly into its rearward limit position illustrated in broken lines in FIG. 3 causes the reverse shift arm 11 to be shifted into its reverse gear position.

In order to prevent the secondary shift lever 60 from being displaced when the primary shift lever 18, and hence the transmission 10, is not in neutral gear, lockout means 62 is provided. In the embodiment illustrated in FIG. 3, the lockout means 62 comprises an arcuate protrusion 63 located on the lower portion of the primary shift lever 18 and a stud 64 mounted on the secondary shift lever 60 and extending outwardly of the plane of movement. The protrusion 63 has a slot 65 which extends inwardly from its periphery and which registers with the stud 64 only when the primary shift lever 18 is in its neutral position. Thus, the secondary shift lever 60 may be displaced rearwardly into its broken line position in FIG. 3 only when the primary lever 18, and hence the transmission 10, is in neutral. As an additional advantage, the interaction of the stud 64 in the slot 65 prevents displacement of the primary shift lever and hence forward shifting of the transmission when the transmission is in reverse gear.

Although the shifter of the present invention is particularly suited for use with four-speed automobile transmissions, the shifter may be used satisfactorily with three-speed automobile transmissions. For instance, if in the illustrated transmission 10, the first-second arm 11 operated to change gears between first and reverse, with the reverse gear position corresponding to the first gear position of the arm 11 in the illustrated embodiment, then the transmission would be in reverse gear when the primary shift lever 18 is in its forward limit position (FIG. 6); the transmission would be in first gear when the primary shift lever 18 is in its rearward limit position (FIG. 7); the transmission would be in second gear when the primary shift lever 18 is again in its forward limit position (FIG. 8); and the transmission would be in third gear when the primary shift lever is again in its rearward limit position (FIG. 9).

In view of the foregoing, it should be apparent that there has now been provided an improved shifter which resists jamming during rapid shifting, which prevents unintentional shifting of a transmission into nonsequential gears during rapid up or down shifting, and which is economical to manufacture.

While a preferred embodiment of the present invention has been described in detail, various modifications, alterations or changes may be made without departing from the spirit and scope of the present invention as defined in the appended claims.

I claim:

1. In a transmission shifter comprising a frame, first and second members mounted in said frame for displacement in alternate directions between limit positions corresponding to different gears, each member having a recess with the recesses located in said members so as to at least partially register with one another when the members are disposed in a neutral gear position intermediate said limit positions, a pin selectively engageable in said recesses, means connected to said pin for displacing said pin and the member engaged therewith in said alternate directions and permitting selective displacement of said pin in a direction transverse to said alternate directions, and means biasing said pin out of engagement with the recess in said first member, the improvement comprising: means providing a stationary surface associated with said members and engaging said pin, said surface extending in said alternate directions and being interrupted to define a gap permitting passage of said pin from one recess to the other recess when said members are in the neutral position, said surface having one guiding portion with a terminus adjacent said gap and extending in one direction away from said gap to maintain said pin in the recess in said first member when said first member is disposed with its recess offset in said one direction from said neutral position, whereby displacement of said first member in the other direction permits said pin to pass through said gap and into the recess in said second member.

2. Apparatus according to claim 1 wherein said surface includes a camming portion adjacent said gap and spaced from said one guiding portion, said camming portion being disposed at an acute angle with respect to said one guiding portion to engage said pin upon displacement in said other direction for camming said pin into the recess in said second member.

3. Apparatus according to claim 2 wherein said surface includes another guiding portion forming an intersection with said camming portion and extending in said other direction to engage said pin for maintaining said pin in the recess in said first member when the first member is disposed with its recess offset in said other direction from said neutral position.

4. Apparatus according to claim 3 wherein said intersection is spaced from said terminus a distance measured in said normal path of movement of the pin which is less than the dimension of said pin in the same direction to prevent said pin from passing through said gap and into the recess in the second member while said pin is engaged with said first member during displacement of said first member in said one direction through the neutral position.

5. A shifter for a transmission, comprising: a frame, a shift lever mounted in said frame to pivot in a single plane, a first member mounted in said frame to pivot on an axis normal to said plane and adapted to one end to be connected to a transmission shift arm, a second member mounted in said frame alongside said first member to pivot on a similarly disposed axis and adapted to one end to be connected to another transmission shift arm, said first member having a downwardly open recess and said second member having an upwardly open recess with said recesses being displaceable into substantial registry with one another upon pivoting of said members into a neutral position, a selector pin disposed transversely to said plane and being sized to be selectively received in said recesses and to normally engage in said upwardly open recess, means mounting said selector pin to said shift lever for displacement between said recesses, and gate means associated with said frame to engage said pin for preventing disengagement thereof from the downwardly open recess in said first member during displacement of said first member in one direction through the neutral position and for guiding said pin out of engagement with the recess in said first member and into engagement with the recess in said second member during displacement of said first member in the opposite direction into the neutral position.

6. Apparatus according to claim 5 wherein said gate means includes an interrupted stationary surface engaging said pin and having a gap disposed between said recesses and sized to permit passage of said pin when said recesses are in registry with said gap and one another, said surface having one guiding portion extending in said one direction away from said gap and another guiding portion extending in the other direction away from said gap and a camming portion spaced from said one guiding portion to engage said pin for positively urging said pin into the upwardly open recess in said second member upon displacement of said first member in said other direction.

7. Apparatus according to claim 6 wherein said first member has an arcuate slot with a predetermined radius of curvature intersecting and extending in opposite directions away from its downwardly open recess for receiving said pin, said downwardly open recess having confronting walls extending away from said slot and inclined toward said one direction at a predetermined acute angle with respect to a line normal to the centerline of the slot, said camming portion of the surface being inclined with respect to said gap and disposed in alignment with one of said walls when the recess in said first member registers with said gap, whereby the selector pin engages said walls and camming surface to arrest motion of the first member during transfer of the pin to the second member.

8. Apparatus according to claim 6 wherein said one guiding portion curves away from said gap and is spaced from the pivotal axis of said first member a lesser distance than the corresponding spacing of said other guiding portion, and including means connected to said pin mounting to bias said pin against said one portion, so that when said first member is displaced by said shift lever in said other direction, said pin rides against said one guiding portion and into said gap.

9. Apparatus according to claim 6 wherein said shift lever has a neutral position corresponding to the neutral position of said members and wherein said means mounting said pin includes link means connected at one end to said shift lever to pivot in a predetermined arc in the plane of movement of said shift lever, said gap in said gate means being at least partially offset from said arc when the shift lever is in its neutral position to prevent said pin from pivoting in said arc and through the gap between the members during displacement of said first member in said one direction by said shift lever.

10. Apparatus according to claim 5 including an operator carried on said shift lever for displacement relative thereto and means connecting said pin-mounting means to said operator for displacing said pin from said upwardly open recess and into said downwardly open recess.

11. Apparatus according to claim 5 wherein said frame includes a pair of plates disposed on opposite sides of said members and shift lever with said gate means being provided on said plates and including means to space said plates from one another.

12. Apparatus according to claim 11 wherein said spacing means includes a hollow collar coaxial with the pivotal axis of said first and second members and engaging endwise between said plates, each member being pivotally mounted on said collar, and including a threaded fastener extending through said collar to engage opposite sides of said plates for compressing said collar therebetween.

13. Apparatus according to claim 5 including a second shift lever located adjacent said first-mentioned shift lever and mounted to said frame to pivot coplanar with said first-mentioned shift lever, and second shift lever being adapted at one end to be connected to a third shift arm on a transmission, and lockout means carried on said shift levers and cooperable to prevent substantial pivotal movement of said second lever when said first lever is out of its neutral position.

14. Apparatus according to claim 13 wherein said lockout means includes an arcuate protrusion on said first lever and a slot extending inwardly from the periphery of said protrusion and stud means on said second lever, said stud means engaging said protrusion to prevent substantial pivotal movement of said second lever when said first lever is out of its neutral position and engaging in said slot to permit pivotal movement of said second lever when said first lever is in its neutral position, whereby the transmission may be shifted into reverse.

15. In a transmission shifter comprising a frame, first and second members mounted in said frame for displacement in alternate directions between limit positions corresponding to different gears, each member having a recess with the recesses located in said members so as to at least partially register with one another when the members are disposed in a neutral gear position intermediate the limit positions, a pin selectively engageable in said recesses, and a shift lever associated with said frame to pivot in a substantially vertical plane, the improvement comprising: a link pivotally mounted to said shift lever with said pin being carried by said link, an operator carried on said shift lever for displacement relative thereto, and means connecting said link to said operator for displacing said link between said recesses.

16. Apparatus according to claim 15 including a second shift lever located adjacent said first-mentioned shift lever and associated with said frame to pivot coplanar with said first-mentioned shift lever, said second shift lever being adapted at one end to be connected to a third shift arm on a transmission, and lockout means carried on said shift levers and cooperable to prevent substantial pivotal movement of said second lever when said first lever is out of its neutral position.

17. According to claim 16 wherein said lockout means includes an arcuate protrusion on said first lever and a slot extending inwardly from the periphery of said protrusion and stud means on said second lever, said stud means engaging said protrusion to prevent substantial pivotal movement of said second lever when said first lever is out of its neutral position and engaging in said slot to permit pivotal movement of said second lever when said first lever is in its neutral position, whereby the transmission may be shifted into reverse.

* * * * *